United States Patent
Finnie et al.

(10) Patent No.: US 9,952,855 B2
(45) Date of Patent: Apr. 24, 2018

(54) SOFTWARE TEST AUTOMATION (71) Applicant: International Business Machines Corporation, Armonk, NY (US)

(72) Inventors: Nicole Y. Finnie, Boeblingen (DE); Christian W. P. Hoerst, Boeblingen (DE); Johannes S. Kern, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 125 days.

(21) Appl. No.: 14/849,999

(22) Filed: Sep. 10, 2015

(65) Prior Publication Data
US 2016/0170863 A1 Jun. 16, 2016

(30) Foreign Application Priority Data
Dec. 10, 2014 (GB) .................... 1421920.8

(51) Int. Cl.
G06F 9/44 (2006.01)
G06F 11/36 (2006.01)
G06F 9/45 (2006.01)

(52) U.S. Cl.
CPC ............. *G06F 8/70* (2013.01); *G06F 8/447* (2013.01); *G06F 11/3664* (2013.01); *G06F 11/3672* (2013.01)

(58) Field of Classification Search
CPC ............ G06F 8/01; G06F 8/30–8/38; G06F 11/3664–11/3696
See application file for complete search history.

(56) References Cited

U.S. PATENT DOCUMENTS

| | | | | |
|---|---|---|---|---|
| 5,452,457 A | * | 9/1995 | Alpert | ............... G06F 8/443 714/E11.192 |
| 5,530,964 A | * | 6/1996 | Alpert | ............... G06F 8/443 714/E11.192 |

(Continued)

FOREIGN PATENT DOCUMENTS

| | | |
|---|---|---|
| CN | 103198009 A | 7/2013 |
| EP | 2605141 A1 | 6/2013 |

OTHER PUBLICATIONS

1421920.8, "Software Test Automation", Filed on: Dec. 10, 2014.

*Primary Examiner* — Tuan Q. Dam
*Assistant Examiner* — Zheng Wei
(74) *Attorney, Agent, or Firm* — Alexander G. Jochym (57) ABSTRACT

In an approach for testing a software application on a target system, a computer provides a test framework being executed on a test framework system, the system being coupled with the target system via network and receives a test scenario by the test framework, the scenario including information regarding a software application to be tested, the target system on which said software application should be executed and regarding one or multiple protocols supported by the target system. The computer interprets information included in said scenario by said test framework and deriving properties associated with at least one software application to be generated based on said information interpretation. The computer then generates an executable software application in a programming language, said application being adapted to the target system by using said derived software application properties. The computer triggers execution of said application thereby obtaining test results, and evaluates said results.

18 Claims, 7 Drawing Sheets

(56) References Cited

U.S. PATENT DOCUMENTS

| | | | |
|---|---|---|---|
| 5,701,471 A | 12/1997 | Subramanyam | |
| 5,754,760 A * | 5/1998 | Warfield | G06F 11/3676 714/35 |
| 5,913,023 A * | 6/1999 | Szermer | G06F 11/3684 714/38.1 |
| 6,002,869 A * | 12/1999 | Hinckley | G06F 11/3696 714/35 |
| 6,038,378 A * | 3/2000 | Kita | G06F 11/3684 714/38.11 |
| 6,301,701 B1 * | 10/2001 | Walker | G06F 11/3688 702/123 |
| 6,373,822 B1 * | 4/2002 | Raj | H04L 1/243 370/241 |
| 6,662,312 B1 | 12/2003 | Keller et al. | |
| 6,826,716 B2 * | 11/2004 | Mason | G06F 11/3684 714/38.1 |
| 6,944,848 B2 * | 9/2005 | Hartman | G06F 11/3684 714/E11.208 |
| 7,039,899 B1 * | 5/2006 | Quiroga | G06F 11/3684 714/E11.207 |
| 7,055,067 B2 * | 5/2006 | DiJoseph | G06F 11/3684 714/33 |
| 7,222,265 B1 * | 5/2007 | LeSuer | G06F 11/3414 714/38.1 |
| 7,287,190 B2 | 10/2007 | Rosenman et al. | |
| 7,299,451 B2 | 11/2007 | Dygon et al. | |
| 7,412,034 B2 | 8/2008 | Rancu et al. | |
| 7,480,900 B1 * | 1/2009 | Zhou | G06F 11/3676 714/38.1 |
| 7,526,681 B2 * | 4/2009 | Anafi | G06F 11/3664 714/38.14 |
| 7,613,953 B2 * | 11/2009 | Voruganti | G06F 11/3688 714/38.1 |
| 7,673,292 B2 * | 3/2010 | Vikram | G06F 11/3684 714/38.14 |
| 7,694,181 B2 | 4/2010 | Noller et al. | |
| 7,730,461 B2 * | 6/2010 | Chamberlain | G06F 9/44 717/125 |
| 7,930,683 B2 | 4/2011 | Li | |
| 7,962,799 B2 | 6/2011 | Lauer et al. | |
| 8,230,267 B2 | 7/2012 | Noller et al. | |
| 8,296,736 B2 | 10/2012 | Jones et al. | |
| 8,458,666 B2 | 6/2013 | Mitra | |
| 8,515,015 B2 | 8/2013 | Maffre et al. | |
| 8,547,974 B1 | 10/2013 | Guruswamy et al. | |
| 8,572,437 B2 | 10/2013 | Chang et al. | |
| 8,578,336 B1 | 11/2013 | Wiradarma et al. | |
| 8,645,326 B2 | 2/2014 | Weizman et al. | |
| 9,117,028 B2 * | 8/2015 | Norton | G06F 11/3684 |
| 2003/0009709 A1 * | 1/2003 | Belenger | G06F 11/3664 714/37 |
| 2003/0131285 A1 | 7/2003 | Beardsley et al. | |
| 2004/0167749 A1 * | 8/2004 | Friedman | G06F 11/36 702/186 |
| 2004/0205406 A1 * | 10/2004 | Kaliappan | H04L 12/2697 714/31 |
| 2005/0229162 A1 | 10/2005 | Tanner, Jr. | |
| 2006/0156288 A1 | 7/2006 | Jones et al. | |
| 2007/0022324 A1 | 1/2007 | Chang et al. | |
| 2007/0220341 A1 | 9/2007 | Apostoloiu et al. | |
| 2008/0040732 A1 * | 2/2008 | Akiyama | G06F 8/30 719/328 |
| 2008/0320071 A1 | 12/2008 | Hoskins et al. | |
| 2011/0047529 A1 * | 2/2011 | Randimbivololona | G06F 11/3664 717/124 |
| 2011/0258600 A1 * | 10/2011 | Osenkov | G06F 11/3684 717/124 |
| 2011/0307860 A1 * | 12/2011 | Park | G06F 8/30 717/107 |
| 2012/0204153 A1 | 8/2012 | Peterson et al. | |
| 2013/0055194 A1 * | 2/2013 | Weigert | G06F 8/10 717/104 |
| 2013/0055213 A1 * | 2/2013 | Weigert | G06F 8/10 717/126 |
| 2013/0080999 A1 | 3/2013 | Yang | |
| 2013/0086420 A1 | 4/2013 | Sgro et al. | |
| 2013/0159974 A1 * | 6/2013 | Norton | G06F 11/3684 717/124 |
| 2013/0332905 A1 * | 12/2013 | Vikutan | G06F 11/3684 717/124 |
| 2013/0339930 A1 * | 12/2013 | Xu | G06F 11/3684 717/125 |
| 2014/0033177 A1 | 1/2014 | Chang et al. | |
| 2014/0181590 A1 | 6/2014 | Wefers | |
| 2014/0289699 A1 * | 9/2014 | Paterson | G06F 11/3664 717/106 |
| 2015/0261660 A1 * | 9/2015 | Shiraishi | G06F 11/3688 714/38.1 |
| 2015/0309813 A1 * | 10/2015 | Patel | G06F 8/75 703/22 |
| 2015/0324275 A1 * | 11/2015 | Luan | G06F 11/3692 717/124 |

\* cited by examiner

SOFTWARE TEST AUTOMATION

BACKGROUND

The invention relates to software test automation. More specifically, the invention relates to a software test automation method for multiple platforms, multiple protocols and multiple programming languages.

A test framework may need to run applications compiled, linked, and executed on a remote software system that has a different platform than the test framework itself is running on. Further such software systems may have multiple protocols, for instance, a database system may allow a client to connect to the database via multiple remote network protocols such as JDBC or ODBC, while also allowing native compiled applications to connect to the database using local protocols or software system specific protocols. These specific protocols may in turn have different implementations when native applications are compiled in different programming languages such as COBOL or C. Each of these software system protocols should be tested to ensure they each follow their respective expected behavior. However, this would require that every single test scenario has to be duplicated in multiple programming languages and protocols, which would cause excessive implementation and maintenance costs. Further, some protocols may require you to compile test scenario code on a remote system in multiple programming languages before it can be run, which inhibits test automation via multiple protocols.

A known manual solution is to manually implement applications in the language required by the protocol A up-front and locally compile these applications and execute them on the target software system. To test other protocols of the target software system, a user may need to write applications in a language different than the protocol A and execute them from a remote platform separate from the target platform. The significant drawback is that this solution requires manual steps when applications have to be tested via all generic and system specific protocols. In addition to this, a user has to implement the same test scenarios in different formats for every protocol, which can be error-prone and inefficient.

SUMMARY

It is an objective of embodiments of the invention to provide an efficient end-to end automated method for software testing being able to cover different protocols used by the target software system. The objective is solved by the features of the independent claims. Preferred embodiments are given in the dependent claims. If not explicitly indicated otherwise, embodiments of the invention can be freely combined with each other.

According to a first aspect, a computer-implemented method for testing a software application on a target system is provided. The method includes the steps of providing a test framework, the test framework being executed on a test framework system, the test framework system being coupled with the target system via network. The method includes receiving a test scenario by the test framework, the test scenario including information regarding a software application to be tested, information regarding the target system on which said software application should be executed and information regarding one or multiple protocols supported by the target system, and interpreting information included in said test scenario by said test framework and deriving properties associated with at least one software application to be generated based on said information interpretation. The method then includes generating at least one executable software application in at least one programming language, said software application being adapted to the target system by using said derived software application properties. The method includes triggering execution of said software application thereby obtaining test results, and evaluating said test results.

The test scenario may be executed, for example, on the test framework system, by the test framework against the target system or by the target system.

One of the main advantages of the proposed method is the flexibility to adapt the software test routine to the needs of the target system, specifically, the target software system. Based on some basic data regarding the target system and the protocols used by said target system, the test framework may automatically define further properties of the software test routine, specifically properties associated with the software application to be generated, for example, the programming language to be used by the test framework for generating a source code of the software application, where to compile said source code and, finally, where to execute the generated software application. Thus, also the adaption of the test routine to protocols available in the future is simplified because said new protocol only needs to be implemented in the test framework and then may automatically be issued without changing the test cases.

According to further embodiments, the test framework chooses the programming language for generating source code of the software application based on information included in the test case. For example, at run time of the software test routine, the test framework determines which protocol should be used and determines one or more appropriate programming languages for said protocol. Based on said programming language selection, one or more source codes are generated in the appropriate programming languages.

According to further embodiments, the programming language is chosen based on configuration information, said configuration information indicating which programming language is required by a protocol supported by the target system. Said configuration information may be stored in a repository, for example, as a configuration file and used by the test framework for choosing the appropriate programming language.

According to further embodiments, at run time of the software application, the test framework investigates which protocols are defined in the test scenario and one software application being programmed in a programming language supported by said protocol or multiple software applications being programmed in different programming languages supported by said protocol are generated. For example, the test framework may group protocols based on how they can be executed on the target software system and creates applications tailored for those protocols. By generating software applications in multiple programming languages it is possible to ensure, that software is running properly on the target system independent of the chosen programming language.

According to further embodiments, the software application is compiled at runtime of the software test. Thus it is possible to create a software application which is tailored for the respective software target system and in case of changes of the software target system, e.g. a new available protocol, no changes of the test scenarios are necessary.

According to further embodiments, the software application is compiled and executed on the test framework system.

According to other embodiments, the source code of the software application is automatically generated within the test framework system and provided to the target system via network for compilation and execution. This procedure may be chosen if information necessary for compiling or executing an application is only available on the target system but not in the test framework.

According to further embodiments, the test framework system provides a compilation job to the target system in order to trigger the compilation of the source code of the software application to be tested. Specifically, said job may trigger the compilation and linkage of the source code of the software application on the target system. The compilation job may comprise information of how to compile said source code.

According to further embodiments, the test framework system provides a job including parameters defined in the test scenario for triggering the execution of the software application. Said parameters may be, for example, scheduling information for scheduling the execution of the application and/or information where to store the test results obtained by executing the application.

According to further embodiments, the execution of the software application provides test results and said test results are forwarded to the test framework system. The test framework system may process said test results and analyze the test results in order to provide information to a user regarding the results of the software test.

According to further embodiments, the test results are converted by the test framework system into a protocol- and/or programming language-independent format. For example, the test results of an SQL query may be converted into a comma separated value (csv) format. Thereby it is possible to derive test results which are comparable with each other in order to determine whether the software test provides the same test results independent of the used protocol or the used programming language.

According to further embodiments, multiple protocol-specific software applications are executed consecutively or in parallel and the results obtained by software applications using different protocols are compared with each other by means of the test framework system. Thereby it is possible to ensure that software applications using different protocols provide the same test results.

According to further embodiments, multiple software applications generated by using different programming languages are executed consecutively or in parallel and the results obtained by using said software applications generated by different programming languages are compared with each other by means of the test framework system. Thereby it is possible to ensure that said software applications being generated in different programming languages provide the same test results.

According to further embodiments, the test framework comprises information regarding the expected results to be provided by the software test and the test framework compares the test results achieved by the execution of the software application with said expected test results.

According to a second aspect, a computer system comprising a test framework system and a target system coupled with the test framework system via network is provided, wherein the computer system is configured to test a software application on said target system. The computer system further includes program instructions to receive a test scenario by the test framework system, the test scenario including information regarding a software application to be tested, information regarding the target system on which said software application should be executed and information regarding the protocols supported by the target system. The computer system includes program instructions to interpret information included in said test scenario and deriving properties associated with a software application to be generated based on said information interpretation, and program instructions to generate at least one executable software application in at least one programming language, said software application being adapted to the target system by using said derived software application properties. The computer system includes program instructions to trigger execution of said software application thereby obtaining test results, and evaluate said test results.

According to a third aspect, a computer program product is provided. The computer program product includes program instructions to receive a test scenario by the test framework system, the test scenario including information regarding a software application to be tested, information regarding the target system on which said software application should be executed and information regarding the protocols supported by the target system. The computer program product includes program instructions to interpret information included in said test scenario and deriving properties associated with a software application to be generated based on said information interpretation, and program instructions to generate at least one executable software application in at least one programming language, said software application being adapted to the target system by using said derived software application properties. The computer program product includes program instructions to trigger execution of said software application thereby obtaining test results, and evaluate said test results.

It will be further understood that the term "protocol", when used in this specification, specifies one or more communication rules or communication means which are used for communication between the test framework system and the target system or target software system.

It will be further understood that the term "target system", when used in this specification, specifies any system on which a software operation may be executed. Target software system may be a specific software system (e.g. a database management system) which is executed on the target system.

It will be further understood that the term "test framework system", when used in this specification, specifies any system on which the test framework may be executed, i.e. which receives a generic test scenario and transforms said test scenario in a format which is adapted to the respective target system for initiating the provision of test results by the target software system.

DETAILED DESCRIPTION

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The block diagrams in the Figures illustrate the architecture, functionality, and operation of possible implementations of systems, methods and computer program products according to various embodiments of the present disclosure. In this regard, each block in the block diagrams may represent a module, segment, or portion of code, which comprises one or more executable instructions for implementing the specified logical function(s). It should also be noted that, in some alternative implementations, the functions discussed hereinabove may occur out of the disclosed order. For example, two functions taught in succession may, in fact, be executed substantially concurrently, or the functions may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

Figure 1:
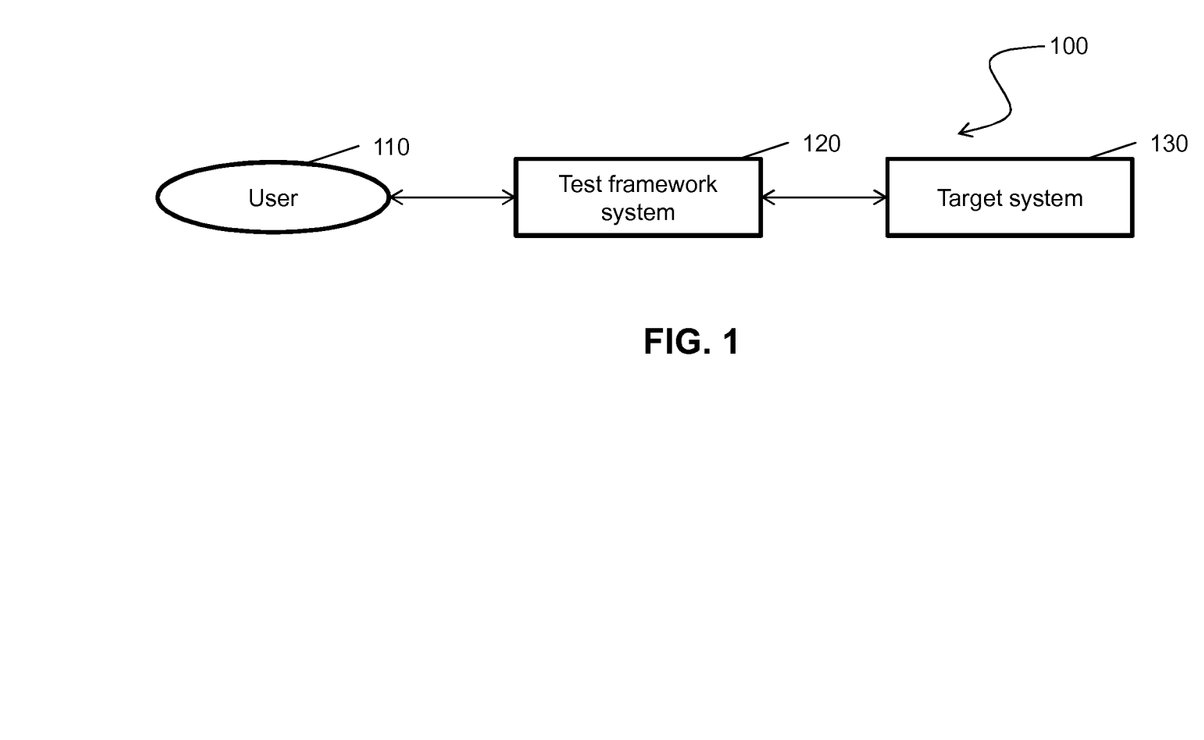
FIG. 1 schematically illustrates an example block diagram of a software test environment, in accordance with an embodiment of the present invention.

FIG. 1 illustrates a basic test environment 100 by means of a schematic block diagram. The system comprises a test framework system 120 and a target system 130. A user 110 may interact with the test framework system 120 via a test framework system interface. Said test framework system interface may be a graphical user interface (GUI), for example a web-based user interface. According to other embodiments, the test framework system interface may be adapted to interact directly with the test framework system 120, for example by using a scripting language. In the test framework system 120, a test framework may be implemented which may receive a generic test scenario as an input provided by the user 110. Said test framework may be adapted to convert said generic test scenario into test information which is suitable for the target system 130. Said test information may be, for example, an automatically generated program code which is provided to the target system 130 for compilation or may be an already compiled application to be run by the target system 130.

It is possible for the test framework system 120 to trigger execution of the test scenario. The test scenario may be executed, e.g., on the test framework system, by the test framework against the target system 130 or by the target system 130. For executing a test scenario on the target system 130, the test framework system 120 provides test information to the target system 130. The test framework system 120 may be coupled with the target system 130 via a network connection, for example a local area network (LAN) or a network at least partially including a wide area network (WAN). After receiving the test information on the target system 130, the target system 130 may execute at least one operation, said operation leading to test results. Said test results may be returned to the test framework system 120. After receiving the test results on the test framework system 120, the test framework system 120 may modify the received test results. For example, the test framework system 120 may convert the received test results in order to obtain a platform-independent and/or programming language-independent and/or protocol-independent test result format. In addition, the test framework may analyze the received (or converted) test results in order to determine whether the test results show any failures or abnormalities. Finally, the information derived from said test results may be forwarded to the user 110 in order to enable the user 110 to examine the results of the test scenario. For example, the test results may be provided to the user at a graphical user interface or a web-based user interface.

As already mentioned before, the target system 130, specifically the target software system included in the target system 130 may use multiple protocols, for instance, a database system may allow a client to connect to the database by multiple remote network protocols such as JDBC or ODBC. In addition, the database system may also allow native compiled applications to connect to the database using local protocols or system specific protocols which are specifically supported by the target system. However, these system specific protocols may be programming language-dependent, i.e. said system specific protocols may have different implementations when native applications are compiled in different programming languages, for example COBOL or C. For providing an automated software testing environment which covers all different possibilities to be tested, every single test scenario has to be duplicated in multiple programming languages and protocols in order to ensure that all implementation possibilities follow their respective expected behavior, i.e. show the expected test results.

In order to implement an automated software testing environment which covers all said implementation possibilities, the user 110 defines a generic test scenario which includes information regarding the target system 130 to be tested and protocols used by said target system 130. Said generic test scenario may be defined, for example, via a unified interface. After providing said generic test scenario to the test framework system 120, the test framework defines the further test routine based on information available in the test framework. Said information may be, for example, stored in a configuration file. For instance, said information may define which programming language should be used to generate an application to be executed. In addition, said information may indicate where to compile and execute the application because some applications can be compiled and executed at the test framework system 120 but other applications have to be locally compiled and executed on the target system 130 (for example, because libraries are necessary for said compilation and execution which are only available on the target system).

The main advantage of the proposed software test environment is that the user only needs to define a test scenario and desired protocols associated with the target system 130. The test framework generates applications in different programming languages required by the respective protocol, execute those applications on or against the target software system over multiple protocols, retrieves test results over the network from the target system 130 and analyzes the received test results. In addition, when the target system supports system specific protocols, the test framework may generate compilation code and compile said application code on the target system. If the user defines expected results in said test scenario, the test framework may compare the received test results with said expected results and may show deviations of the received test results from said expected results. In addition, the test framework may be adapted to test the target system using the same test scenario over multiple protocols supported by the target system and compare the test results obtained by using said different protocols in order to determine deviations between said protocols. Said software test routine is a fully automated end-to-end process, i.e. after defining the generic test scenario and triggering the execution of said generic test scenario, there are no manual steps necessary which are executed by human for running the software test.

A further advantage of the proposed automated software test environment is if a new supported protocol of the target system is added in the future, the new protocol only needs to be implemented in the test framework once, and all test cases can be automatically issued using this new protocol without changing the test cases. This makes legacy test cases highly extendable and maintainable.

Figure 2:
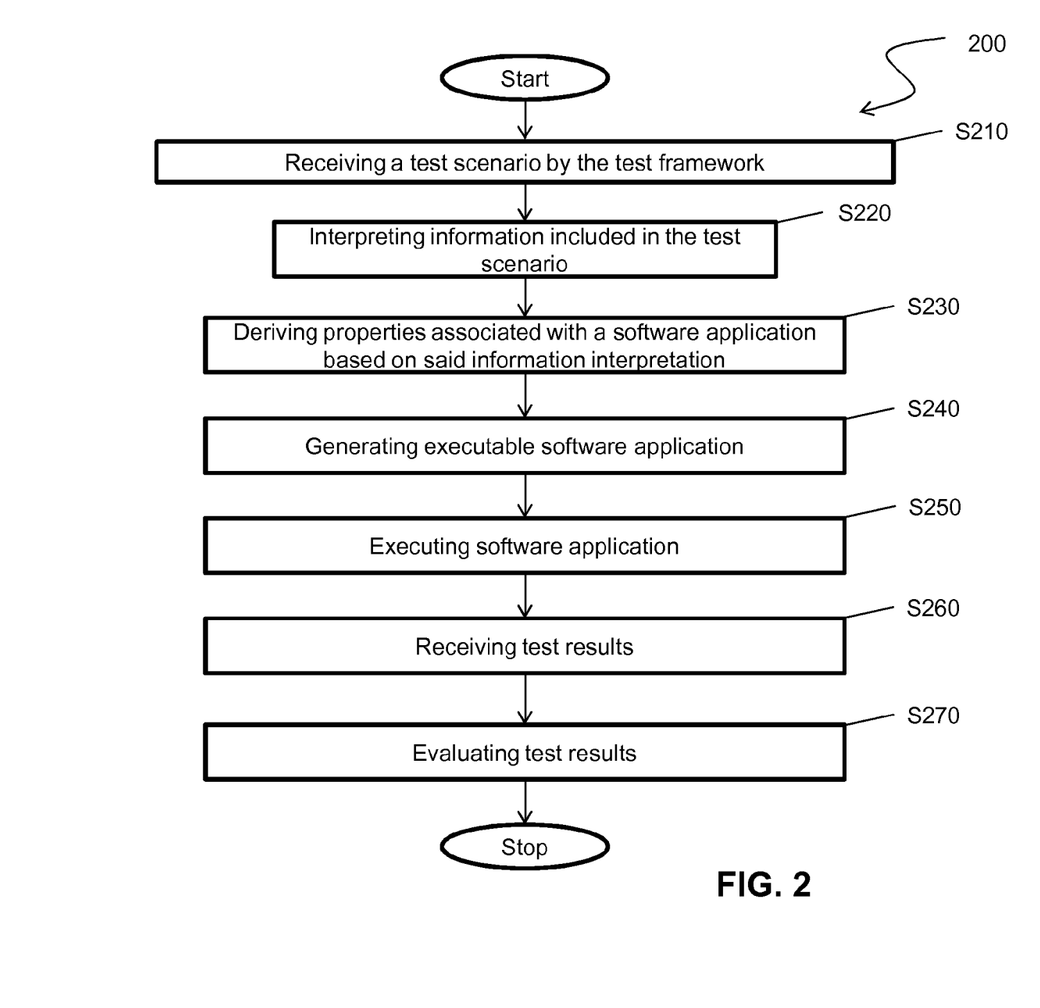
FIG. 2 schematically illustrates an example flow diagram of a software test routine, in accordance with an embodiment of the present invention.

FIG. 2 shows an example flow chart indicating the steps of a software test procedure 200. Said steps have to be executed by the software test environment for automated software testing. After the software test procedure 200 starts, a test scenario may be received by the test framework (S210). Said test scenario may be created by the user 110 and provided by said user 110 to the test framework system 120.

After receiving the test scenario, information included in the test scenario is interpreted by the test framework (S220). More in detail, the test scenario includes information regarding the target system which has to be tested and information regarding protocols supported by said target system.

Based on said information interpretation, the properties associated with a software application to be tested are derived (S230). Said properties may be, for example, the programming language used for creating the software application, information regarding the system used for executing the software application or information regarding system specific protocols supported by the chosen target system, specifically by the chosen target software system.

Based on said derived software application properties, an executable software application is generated (S240). Said generation of said executable software application may comprise the steps of generating source code of the software application by using the appropriate programming language defined in the previous step and compiling the generated source code in order to obtain an executable software application. Depending on properties of the target system, the test framework may decide whether to compile the source code at the test framework system or on the target system. For example, it may be necessary to compile the source code on the target system because certain libraries necessary for compiling the source code are only available on the target software system. In case that multiple protocols are supported by the target software system and/or different programming languages can be used for generating a software application associated with a certain protocol, multiple software applications can be generated in order to cover all possible implementations of the software application, i.e. to cover all possible sources of error.

After at least one executable software application is generated, said software application is executed (S250). Said software application may be executed on the test framework system and may initiate an operation on the target software system via said network (e.g. executing a database operation on a database system where the target software system is a database system). However, the software application can be also executed on the target system itself, specifically by the operating system of the target system in case that specific runtime environment is necessary for running the software application.

By running said software application, test results are obtained on the target system which are provided to the test framework. After the test framework system receives the test results (S260), the test results are evaluated or analyzed by the test framework (S270). For example, the test framework may execute a conversion routine for converting the received test results into a platform-independent and/or protocol-independent and/or programming language-independent format. Said format may be for example .csv-format (csv: comma separated value). In case that multiple software applications covering multiple protocols are executed consecutively or in parallel, the results received from said multiple protocols are compared with each other in order to determine deviations of the test results associated with said different protocols. Similarly, in case that multiple software applications are generated in different programming languages which are associated with the same protocol, the test results obtained by executing said multiple software applications are compared with each other in order to determine any differences between the test results.

Furthermore, in case that expected test results are defined in the test framework, the test framework may compare the received test results with said expected results. After finishing the evaluation or analysis step, the software test procedure 200 is stopped.

Figure 3:
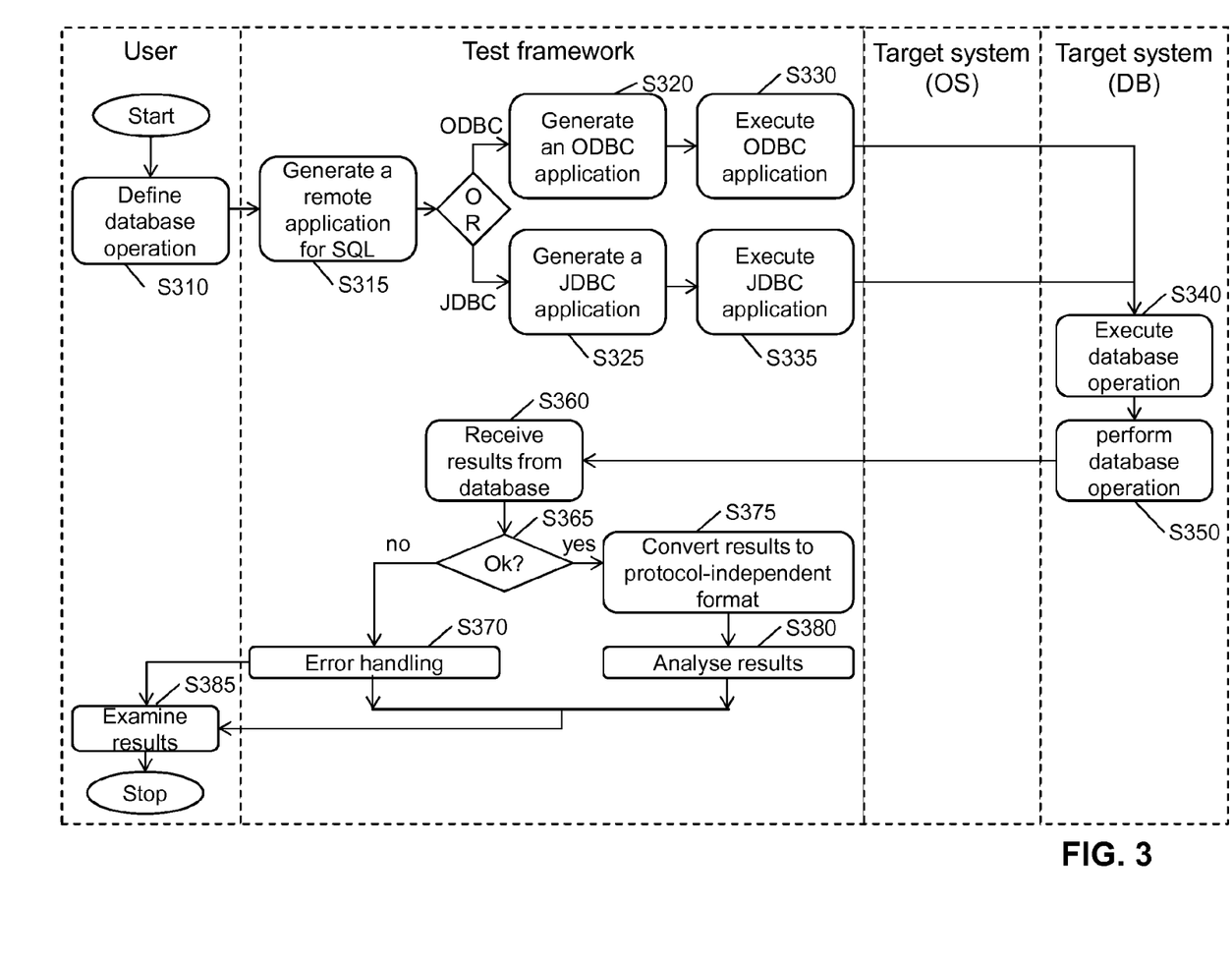
FIG. 3 schematically illustrates an example data flow diagram of a software test routine according to a first embodiment, in accordance with an embodiment of the present invention.

FIG. 3 shows a flowchart illustrating the steps of an automated software testing routine when testing a software application initiating the execution of a database operation at a database system. In the current embodiment, the target system includes a database host running an operating system (target system (OS)) and the target software system implementing the database management system. The database host including the target software system forms the aforementioned target system.

In the beginning of the software testing routine, the user creates a test scenario including at least one definition of a database operation, for example, an SQL query (S310). Said test scenario is provided to the test framework. After receiving the test scenario, the test framework generates the remote application for SQL (S315) by determining which remote application protocol defined in the test scenario is desired. If the test scenario specifies one or more SQL statements that should be executed over ODBC, the test framework will generate necessary C source code instructions to run specified SQL statements as an ODBC application, whereas if the test scenario specifies one or more SQL statements that should be executed over JDBC, the test framework will generate necessary Java instructions to run specified SQL statements as a JDBC application (S320, S325). More in detail, the ODBC or JDBC application is created by generating an application source code and compiling said source code within the test framework system.

After the ODBC or JDBC application is generated, said application is executed (S330, S335). Said execution may trigger a database operation. For example, a database query is transmitted to the target system, specifically to the target software system for initiating the execution of the database operation on the target software system (S340). By executing said database operation, the database operation results are returned, i.e. for an SQL query, at least one value included in the database is returned (S350). According to another example, for a DDL statement such as CREATE/DROP TABLE or a DML statement such as INSERT/UPDATE/DELETE, the database returns a success or failure return code. Said returned database operation result (e.g. returned result of an SQL statement) is forwarded to the test framework which receives the result obtained by said database operation (S360). After receiving the test results from the database operation, a validation may be performed by the test framework to determine whether the test results obtained by the database operation comprises proper values, i.e. it is checked whether the database operation has been successfully performed (S365). If not (S365, "no" branch), an error handling procedure is triggered (S370). Otherwise (S365, "yes" branch), the received test results are converted into a platform-independent and/or protocol-independent and/or programming language-independent format (S375) in order to be able to compare test results which will be obtained by using software applications for different protocols or software applications programmed in different programming languages. For example, the test results from an SQL query are converted to a comma separated value (csv) format.

After said test results are converted, said results may be analyzed (S380) and forwarded to the user to be able to examine the results (S385). Finally, the software test routine is stopped.

Figure 4:
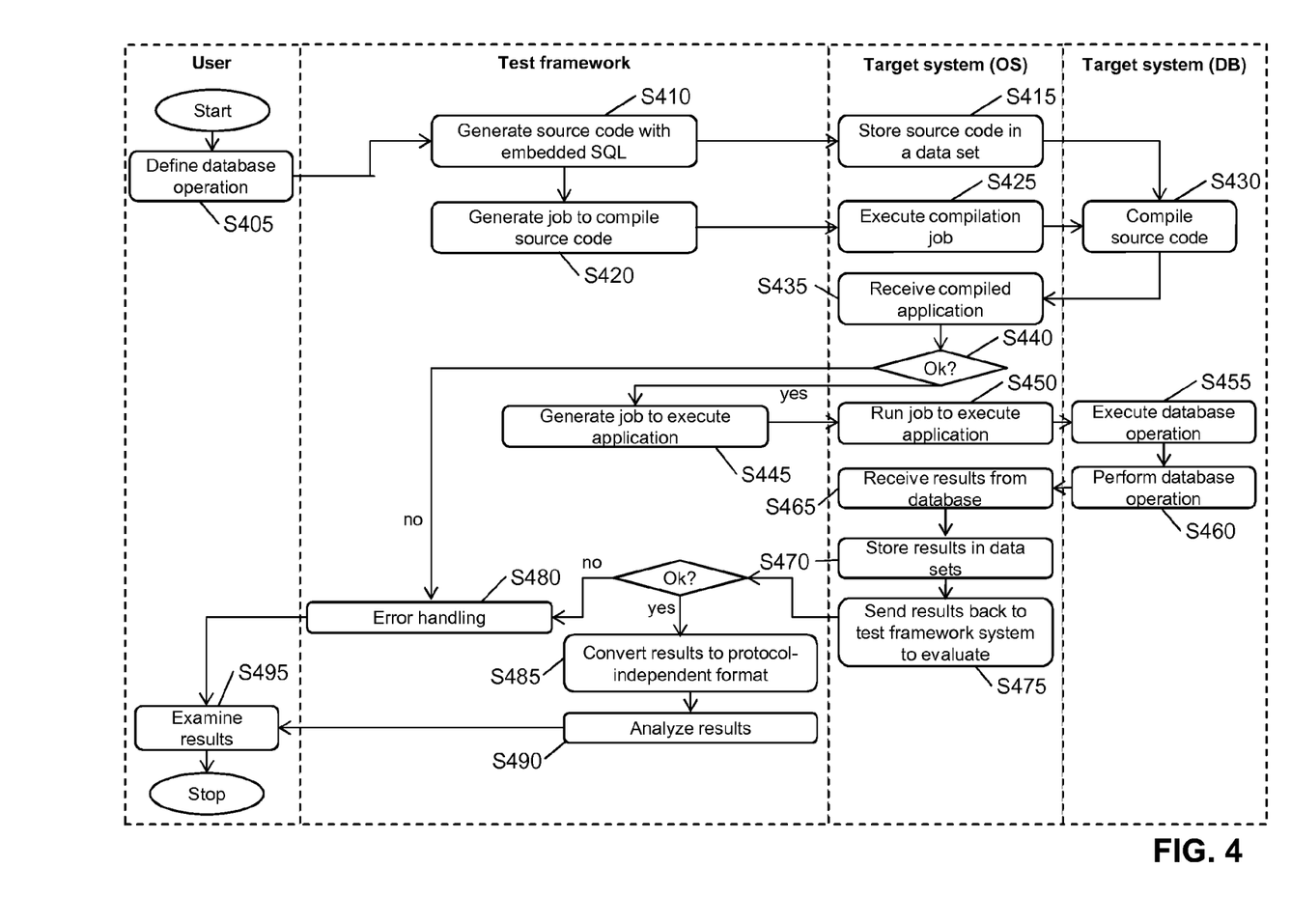
FIG. 4 schematically illustrates an example data flow diagram of a software test routine according to a second embodiment.

FIG. 4 shows a further embodiment of an automated software test routine including the execution of a database operation. In the beginning of the software testing routine, the user creates a test scenario including at least one definition of a database operation, for example, an SQL query (S405). Said test scenario is provided to the test framework. The main difference between the present embodiment and the embodiment of FIG. 3 is that it is necessary to compile and execute the software application on the target system. The reason for this may be that certain libraries necessary for compiling the source code of the software application are only available on the target system or other environment parameters necessary for executing the software application are only fulfilled on the target system but not on the test framework system.

Thus, after receiving the test scenario information, the test framework system S120 generates source code with an embedded database operation (S410). Said source code is provided to the target system in order to store said source code in a data set or repository (S415). After transmitting the source code to the target system, the test framework generates a job for triggering compilation of the source code (S420). Said job which is generated at run time of the software test routine may include information to tell the target system how to compile the source code.

Said generated compilation job is forwarded to the target system. By executing the compilation job on the target system (S425), the source code is compiled in the target software system, i.e. the database management system using the source code stored by the target system as an input (S430). As a result of said compilation, an executable software application is generated. Said compiled application is received by the operating system of the target system (S435) and stored or buffered for further usage. Preferably, the software application may be checked or tested with respect to any formal or runtime errors by the target system. If any errors are detected (S440, "no" branch), an error handling routine may be initiated (S480) and an error message may be forwarded to the user. Otherwise, the target system acknowledges the generation of an executable application to the test framework.

After receiving said acknowledgment (S440, "yes" branch), the test framework generates a job at run time for executing the generated executable software application (S445). Said job may include parameters defined in the test scenario for performing the database operation. More in detail, the job may define how the target software system may execute the database operation such as an SQL operation and where the results of said database operation may be stored.

After generating said job, the job may be forwarded to the target system, specifically to the operating system of said target system for running said job (S450). Running said job may initiate the execution of the application stored or buffered on the target software system (S455). After said application is executed, the database operation is performed, i.e. for an SQL query, one or more values included in the database may be returned (S460). Said returned database operation result is forwarded to the operating system which receives the result generated by said database operation (S465). After the operating system receives the test results generated by the database operation, the test results may be stored in data sets in a data repository (S470) specified by said job. In addition, a validation may be performed by the test framework to determine whether the test results generated by the database operation comprises proper values, i.e. it is checked whether the database operation has been successfully performed (S475). If not, the error handling procedure is triggered (S480). Otherwise, the received test results are optionally converted by the test framework into a platform-independent and/or protocol-independent and/or programming language-independent format (S485) in order to be able to compare test results which will be obtained by using software applications for different protocols or software applications programmed in different programming languages. For example, the test results are converted in a comma separated value (csv) format.

After said test results are converted by the test framework, said results may be analyzed (S490) and forwarded to the user to be able to examine said results (S495). Finally, the software testing routine is stopped.

Some target systems or target software systems might offer their own specific protocols, utilities or APIs to simplify implementation of user applications. Those protocols are in the following referred to as system specific protocols. For these system specific protocols, the test framework generates protocol-specific jobs that also includes protocol-specific libraries or APIs, which are implemented on the target software system. The test framework sends these jobs to the target system, and the target system interprets these jobs and invokes said libraries or APIs. When said libraries or APIs are invoked, respective operations are performed on the target software system.

Figure 5:
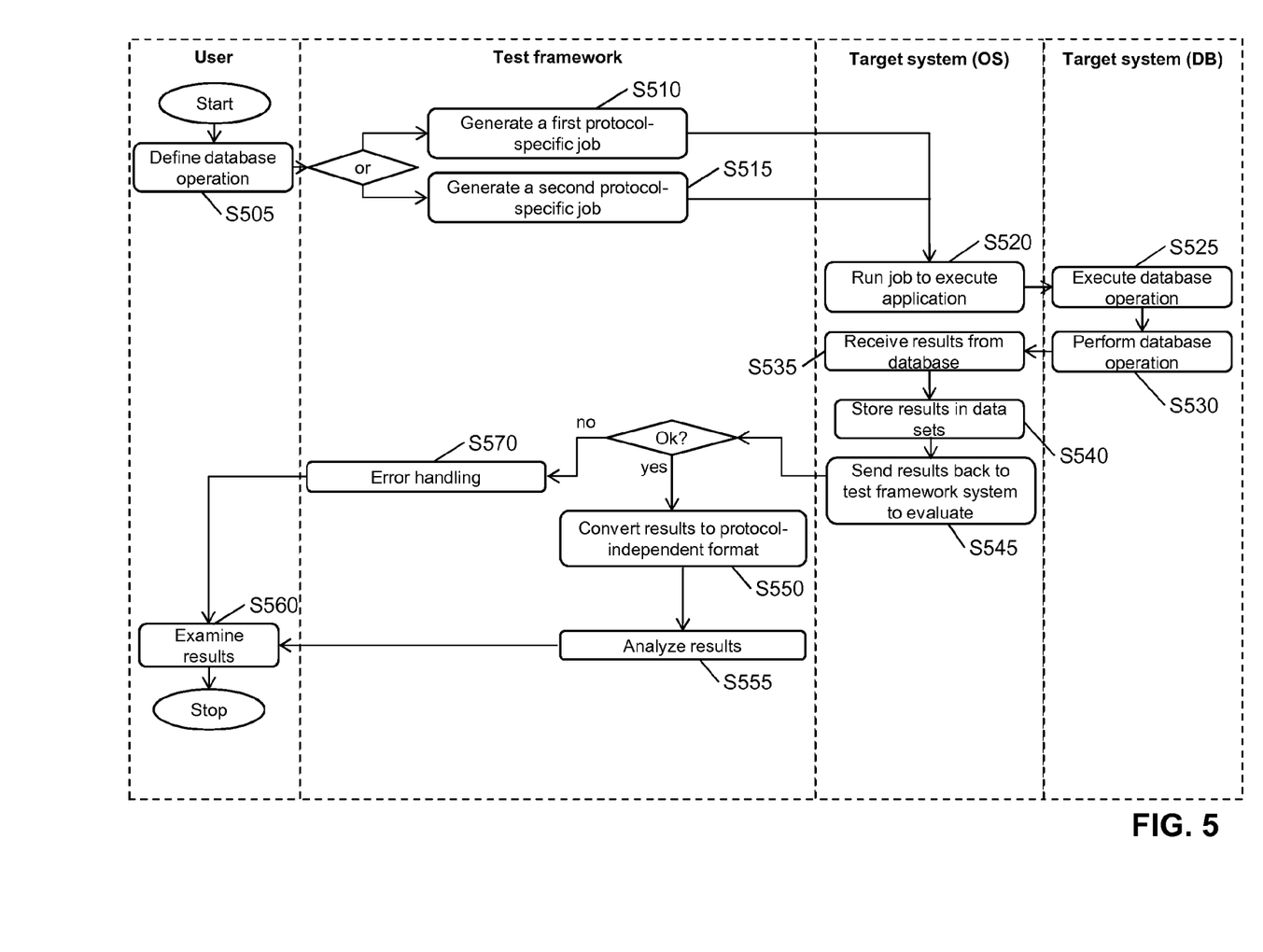
FIG. 5 schematically illustrates an example data flow diagram of a software test routine according to a third embodiment.

Referring to FIG. 5, a test scenario including a target software system supporting system specific protocols is described in greater detail. Similar to FIGS. 3 and 4, after starting the software testing routine, the user creates a test scenario including at least one definition of a database operation, for example, an SQL query (S505). Said test scenario is provided to the test framework.

Depending on the target system specified in the test scenario, the test framework may decide which system specific protocol has to be used. Depending on the system specific protocol to be used, the test framework may generate a protocol specific job (S510, S515). The libraries or APIs included in said job to be invoked during the software test may be already available on the target system. The job which was generated on the previous step may be run to execute said application (S520). For example, said job may include parameters defined in the test scenario for performing the database operation. More in detail, the job may define how the target software system may execute the database operation (e.g. an SQL-operation) and where the results of said database operation may be stored.

As a result of executing said application, in the present example, a database operation is executed on the target software system (S525) which triggers the database access, for example, at least one value included in the database is returned or the database returns a success/failure return code (S530). Said returned database operation result is forwarded to the operating system of target system which receives the result obtained by said database operation (S535). After the test results obtained by the database operation are received, the test results may be stored in data sets in a data repository (S540). In addition, a validation may be performed by the test framework to determine whether said test results comprise proper values, i.e. it is checked whether the database operation has been successfully performed (S545). If not, an error handling procedure is triggered (S570). Otherwise, the received test results are converted by the test framework into a platform-independent and/or a protocol-independent and/or programming language-independent format (S550) in order to be able to compare test results which will be obtained by using software applications for different protocols or software applications programmed in different programming languages. For example, the test results of SQL queries are converted in a comma separated value (csv) format.

After the test results are converted, the results may be analyzed (S555) and forwarded to the user to be able to examine the results (S560). Finally, the software testing routine is stopped.

Figure 6A:
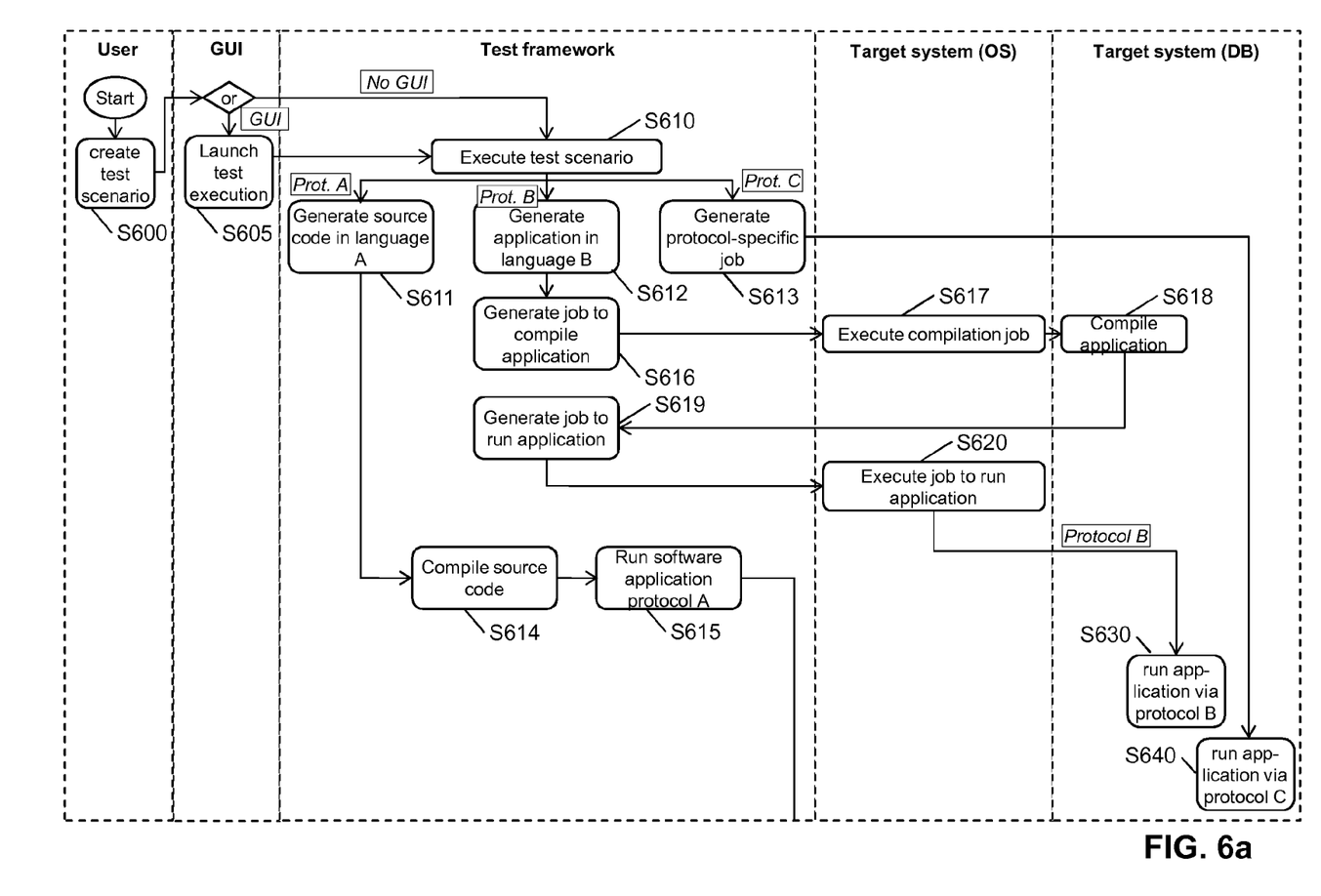
FIGS. 6a and 6b schematically illustrate an example data flow diagram of an end-to-end process of an automated software test, in accordance with an embodiment of the present invention.
Figure 6B:
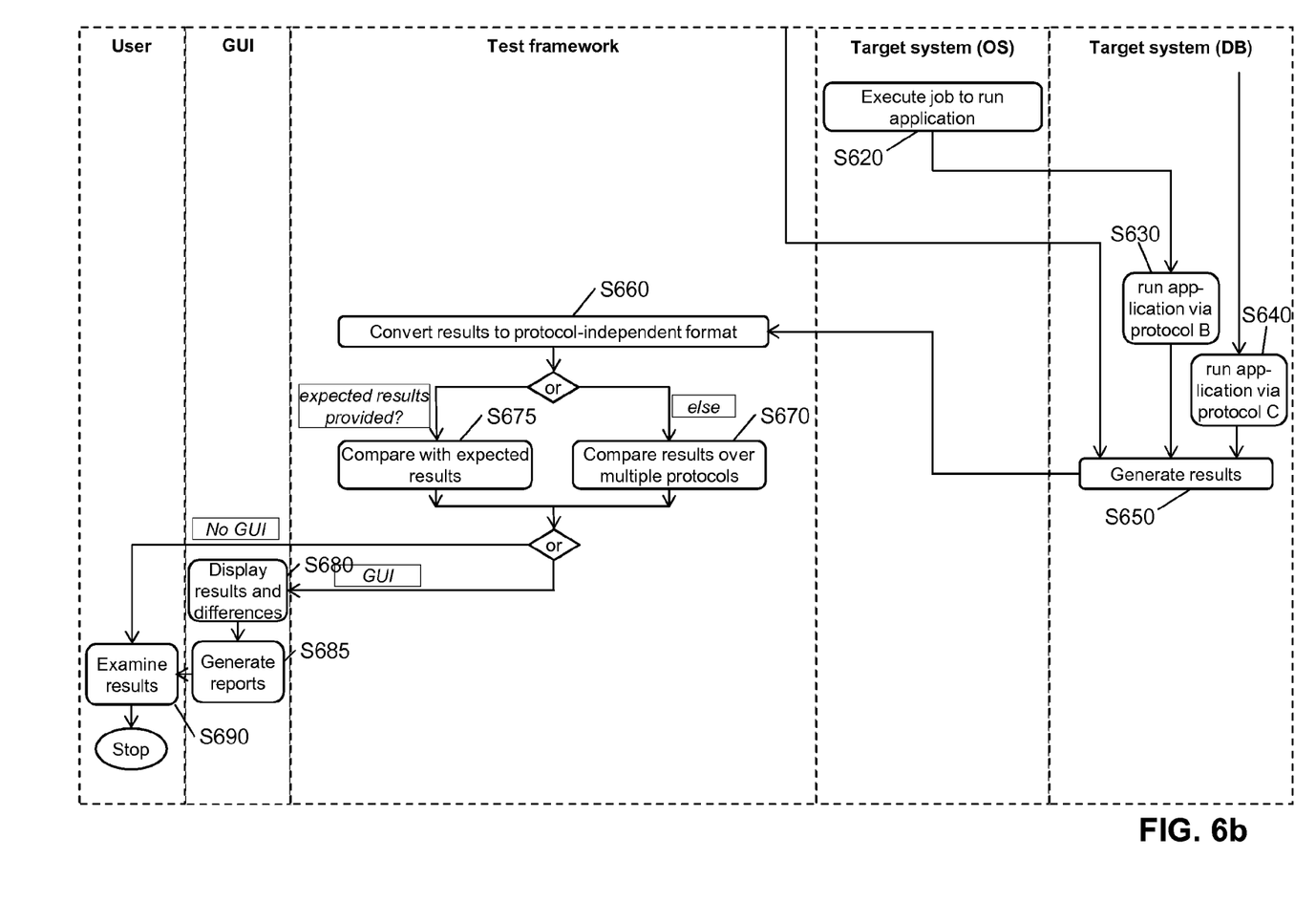

FIGS. 6*a* and 6*b* show the overall process of an automated software test. At the beginning, the user may create a test scenario which includes the basic information of the software test routine, for example, information regarding the target system and information of the protocols used by the target software system implemented on the target system (S600). The software test environment may, for example, provide a graphical user interface (GUI), specifically a web-based GUI for displaying information regarding the software test routine. The user may launch the test execution based on said GUI or may use another procedure for launching the execution of the test, for example, using a script (S605).

After said test execution is launched, the software test defined in the test scenario is executed (S610). At runtime of the software test, the test framework examines what protocols are defined in the test scenario and generates source code in different programming languages which are supported by the respective protocols. As already mentioned above, the test framework may be adapted to generate different applications by using different programming languages for the same protocol in order to avoid the situation where different software behavior occurs because of using different programming languages. In the present example, for protocol A, source code is generated in the programming language A (S611) and for protocol B, source code is generated in the programming language B (S612). Protocol C may be a system specific protocol. Therefore, similar to the embodiment of FIG. 5 described before, the test framework generates protocol-specific jobs (S613).

Regarding protocol A (similar to the embodiment described in FIG. 3), the test framework directly generates the software application by compiling the generated source code (S614) and executes the software application within the test framework (S615). By executing the software application, an operation on the target software system may be triggered, for example a database operation, which returns test results. The software application executed within the test framework triggers an operation on the target software system thereby deriving test results.

The software test scenario including protocol B requires compilation and execution of the software application generated at run time of the software test routine (similar to the embodiment of FIG. 4). After generating source code in programming language B, the test framework generates a job to compile the source code (S616) and triggers the execution of the compilation job on the target system. After the compilation job by the operating system of the target system is executed (S617), the source code is compiled on the target software system (S618), where required libraries for compiling the source code are available, thereby deriving an executable application. After said executable application is generated, a job for running said application is created within the test framework (S619). As already mentioned above in conjunction with FIG. 4, the job may include parameters provided by the test scenario, e.g. which operation has to be executed and where test results have to be stored.

The generated job may be forwarded to the target system in order to execute said job by the operating system of the target system (S620). The execution of said job triggers the execution of the application which was created before (S630).

In case that protocol C is used, the generated job (S613) directly triggers the execution of an application on the target software system (S640).

Independent of the used protocol, test results are obtained by executing said software applications (S650). Said test results are transmitted from the target system to the test framework. The test framework may convert the test results into a protocol independent format in order to ensure the comparability of the obtained test results (S660).

In case that the software test is run over multiple protocols, the results obtained over said multiple protocols are compared with each other (S670) in order to determine deviations of the test results. According to another embodiment, if expected test results are provided, the test framework may compare the obtained test results with the expected test results and may determine deviations between the obtained test results and the expected test results (S675). Also a combination of comparing test results over multiple protocols and comparing expected test results is possible.

If a graphical user interface is provided, the results and differences of the test results may be displayed in said graphical user interface (S680). Furthermore, reports may be generated in the graphical user interface (S685). Finally, the user may be able to examine the results (S690). In case no graphical user interface is provided, the results of steps S670 and/or S675 may be directly provided to the user in order to examine the results (S690).

The embodiments described above based on FIGS. 3 to 6b refer to a test routine triggering a database routine. However, the present invention is not limited to the testing of software applications running on target systems including database functionality but generally refers to any target system on which a software application may run.

The foregoing description of embodiments has been presented for purposes of illustration and description. It is not intended to be exhaustive or to limit embodiments of the present invention to the precise form disclosed. Modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations without leaving the scope of the underlying principle ideas.

The invention claimed is:

1. A computer-implemented method for testing a software application on a target system, the method comprising the steps of:

providing a test framework, the test framework being executed on a test framework system, the test framework system being coupled with the target system via network;

receiving a test scenario by the test framework, the test scenario including information regarding a software application to be tested, information regarding the target system on which said software application should be executed and information regarding one or multiple protocols supported by the target system;

interpreting information included in said test scenario by said test framework and deriving properties associated with at least one software application to be generated based on said information interpretation;

generating multiple executable software applications in at least one programming language, said generated software applications being adapted to the target system by using said derived software application properties;

wherein said generated software applications using different programming languages are executed in parallel;

triggering execution of said generated software applications thereby obtaining test results; and evaluating said test results, wherein evaluating includes determining whether the test results obtained by a database operation indicate the database operation was successfully performed; and responsive to a determination that the test results obtained by the database operation indicate the database operation was successfully performed, converting the test results into a platform-independent, protocol-independent, and programming language-independent format to compare the test results obtained utilizing said generated software applications for different protocols in different programming languages.

2. The method according to claim 1, wherein the test framework chooses the programming language for generating source code of the software application based on information included in the test scenario.

3. The method according to claim 2, wherein the at least one programming language is chosen based on configuration information, said configuration information indicating which programming language is required by a protocol supported by the target system.

4. The method according to claim 2, wherein at run time of the software application, the test framework investigates which protocols are defined in the test scenario and one software application being programmed in a programming language supported by said protocol or multiple software applications being programmed in different programming languages supported by said protocols are generated.

5. The method according to claim 1, wherein the software application is compiled at runtime of the software test.

6. The method according to claim 1, wherein the software application is compiled and executed in the test framework system.

7. The method according to claim 1, wherein the source code of the software application is automatically generated within the test framework system and provided to the target system via network for compilation and execution.

8. The method according to claim 7, wherein the test framework system provides a compilation job to the target system in order to trigger the compilation of the source code of the software application to be tested.

9. The method according to claim 7, wherein the test framework system provides a job including parameters defined in the test scenario for triggering the execution of the software application.

10. The method according to claim 1, wherein the execution of the software application provides test results and said test results are forwarded to the test framework system.

11. The method according to claim 1, wherein multiple protocol-specific software applications are executed consecutively or in parallel and the results obtained by software applications using different protocols are compared with each other by means of the test framework system.

12. A computer system comprising a test framework system and a target system coupled with the test framework system via network, the computer system being configured to test a software application on said target system, the computer system further comprising:
one or more computer processors;
one or more computer readable storage device(s); and
program instructions stored on the one or more computer readable storage device(s) for execution by at least one of the one or more computer processors, the program instructions comprising:
program instructions to receive a test scenario by the test framework system, the test scenario including information regarding a software application to be tested, information regarding the target system on which said software application should be executed and information regarding the protocol supported by the target system;
program instructions to interpret information included in said test scenario and deriving properties associated with a software application to be generated based on said information interpretation;
program instructions to generate multiple executable software applications in at least one programming language, said generated software applications being adapted to the target system by using said derived software application properties;
wherein said generated software applications using different programming languages are executed in parallel;
program instructions to trigger execution of said generated software applications thereby obtaining test results; and
program instructions to evaluate said test results, wherein evaluating includes determining whether the test results obtained by a database operation indicate the database operation was successfully performed; and
responsive to a determination that the test results obtained by the database operation indicate the database operation was successfully performed, program instructions to convert the test results into a platform-independent, protocol-independent, and programming language-independent format to compare the test results obtained utilizing said generated software applications for different protocols in different programming languages.

13. The computer system of claim 12, wherein the test framework chooses the programming language for generating source code of the software application based on information included in the test scenario.

14. The computer system according to claim 13, wherein the programming language is chosen based on configuration information, said configuration information indicating which programming language is required by a protocol supported by the target system.

15. The computer system according to claim 13, wherein at run time of the software application, the test framework investigates which protocols are defined in the test scenario and one software application being programmed in a programming language supported by said protocol or multiple software applications being programmed in different programming languages supported by said protocols are generated.

16. A computer program product testing a software application on a target system, the computer program product comprising:
one or more computer readable storage memory and program instructions stored on the one or more computer readable storage memory, the program instructions comprising:
program instructions to receive a test scenario by the test framework system, the test scenario including information regarding a software application to be tested, information regarding the target system on which said software application should be executed and information regarding the protocol supported by the target system;
program instructions to interpret information included in said test scenario and deriving properties associated with a software application to be generated based on said information interpretation;
program instructions to generate multiple executable software applications in at least one programming language, said generated software applications being adapted to the target system by using said derived software application properties;
wherein said generated software applications using different programming languages are executed in parallel;

program instructions to trigger execution of said generated software applications thereby obtaining test results; and program instructions to evaluate said test results, wherein evaluating includes determining whether the test results obtained by a database operation indicate the database operation was successfully performed; and responsive to a determination that the test results obtained by the database operation indicate the database operation was successfully performed, program instructions to convert the test results into a platform-independent, protocol-independent, and programming language-independent format to compare the test results obtained utilizing said generated software applications for different protocols in different programming languages.

17. The computer program product according to claim 16, wherein the test framework chooses the programming language for generating source code of the software application based on information included in the test scenario.

18. The computer program product according to claim 17, wherein the programming language is chosen based on configuration information, said configuration information indicating which programming language is required by a protocol supported by the target system.

* * * * *